US012441575B1

(12) United States Patent
Chen

(10) Patent No.: US 12,441,575 B1
(45) Date of Patent: Oct. 14, 2025

(54) ROLL PAPER CUTTING DEVICE

(71) Applicant: Xiaoli Chen, Hunan (CN)

(72) Inventor: Xiaoli Chen, Hunan (CN)

( * ) Notice: Subject to any disclaimer, the term of this patent is extended or adjusted under 35 U.S.C. 154(b) by 0 days.

(21) Appl. No.: 19/059,161

(22) Filed: Feb. 20, 2025

(51) Int. Cl.

| | |
|---|---|
| ***B65H 35/06*** | (2006.01) |
| ***B26B 27/00*** | (2006.01) |
| ***B65D 83/08*** | (2006.01) |
| ***B65H 35/00*** | (2006.01) |
| ***B65H 35/04*** | (2006.01) |

(52) U.S. Cl.
CPC ......... *B65H 35/06* (2013.01); *B65D 83/0882* (2013.01); *B65H 35/0006* (2013.01); *B65H 35/002* (2013.01); *B65H 35/008* (2013.01); *B65H 35/04* (2013.01); *B26B 27/00* (2013.01); *B65H 2301/51512* (2013.01); *B65H 2301/515123* (2013.01); *B65H 2301/51532* (2013.01); *B65H 2301/5154* (2013.01); *B65H 2301/51541* (2013.01); *B65H 2701/1944* (2013.01)

(58) Field of Classification Search
CPC .............. B65H 35/0006; B65H 35/002; B65H 35/008; B65H 35/0086; B65H 35/04; B65H 35/06; B65H 2301/5151; B65H 2301/51512; B65H 2301/515123; B65H 2301/51532; B65H 2301/5154; B65H 2301/51541; B65H 2701/1944; B65H 2301/122; B65D 83/0841; B65D 83/0882; B26B 29/00; B26B 29/06; B26B 1/00; B26B 1/01; B26B 3/00; B26B 3/08; B26B 27/00
USPC ....... 224/526; 225/43, 55, 56, 61, 89; 83/56, 83/648, 649
See application file for complete search history.

(56) References Cited

U.S. PATENT DOCUMENTS

| | | | | | |
|---|---|---|---|---|---|
| 1,718,143 | A * | 6/1929 | Hancock | B65H 35/002 | 225/56 |
| 2,253,744 | A * | 8/1941 | Witt | B65H 35/0006 | 225/42 |
| 2,823,969 | A * | 2/1958 | Traver | B65H 35/0086 | 83/454 |
| 4,196,647 | A * | 4/1980 | Fish | B65D 85/672 | 83/610 |
| 4,417,495 | A * | 11/1983 | Gordon | B26D 7/14 | 83/37 |
| 5,146,828 | A * | 9/1992 | Huang | B65H 35/0006 | 83/649 |
| 5,222,644 | A * | 6/1993 | Moreno | B65H 35/002 | 225/89 |
| 5,383,590 | A * | 1/1995 | Ho | B65H 35/002 | 225/87 |
| 5,660,313 | A * | 8/1997 | Newbold | A47K 10/32 | 242/598.6 |
| 5,850,960 | A * | 12/1998 | Cadwell | B65H 35/0006 | 225/77 |

(Continued)

*Primary Examiner* — Anna M Momper
*Assistant Examiner* — Raveen J Dias

(57) ABSTRACT

The application discloses a roll paper cutting device. The roll paper cutting device adopts an improved opening and closing design. When paper cutting is required, the left semi-cylinder and the right semi-cylinder can be opened, and the left semi-cylinder and the right semi-cylinder can be closed after paper is put in, and then the paper can be cut with a blade. This design is more convenient for putting in roll paper, and it is also more convenient to change and cut other roll paper.

5 Claims, 7 Drawing Sheets

(56) References Cited

U.S. PATENT DOCUMENTS

| | | | | |
|---|---|---|---|---|
| 7,694,617 | B2 * | 4/2010 | Habra | B26D 1/065<br>83/578 |
| 8,714,428 | B2 * | 5/2014 | Mallard | B65D 83/0841<br>225/77 |
| 9,868,222 | B2 * | 1/2018 | Leason | B26D 1/025 |
| D915,507 | S * | 4/2021 | Cran | D18/34.9 |
| D968,190 | S * | 11/2022 | Tang | D8/98 |
| 11,717,977 | B1 * | 8/2023 | Xie | B26B 3/08<br>30/278 |
| 11,987,467 | B2 * | 5/2024 | Perla | B65H 35/06 |
| 2003/0178462 | A1 * | 9/2003 | Huang | B65H 35/002<br>225/56 |
| 2005/0205637 | A1 * | 9/2005 | Kazama | B26D 1/385<br>225/43 |
| 2007/0210131 | A1 * | 9/2007 | Yarborough | B65H 49/205<br>225/56 |
| 2010/0116862 | A1 * | 5/2010 | Horstmann | B65H 35/002<br>225/11 |
| 2013/0064612 | A1 * | 3/2013 | Tucker | B65H 35/0086<br>407/1 |
| 2013/0126577 | A1 * | 5/2013 | De Rossi | B65H 35/002<br>225/46 |
| 2015/0059188 | A1 * | 3/2015 | Haas | B26B 3/08<br>30/279.2 |
| 2018/0345516 | A1 * | 12/2018 | Perla | B26D 1/045 |
| 2019/0168985 | A1 * | 6/2019 | Vegliante | B26D 1/045 |
| 2022/0185611 | A1 * | 6/2022 | Jang | B26D 1/045 |
| 2024/0300769 | A1 * | 9/2024 | Liu | B26D 7/14 |

* cited by examiner

ROLL PAPER CUTTING DEVICE

FIELD OF THE APPLICATION

The present invention relates to the technical field of paper cutting devices, and in particular to a roll paper cutting device.

BACKGROUND

In daily life, it is common to roll paper onto a cardboard tube or shape it into a cylinder for easier transportation and storage, which also helps preserve the paper better. When needed, the paper can be unfolded and cut to the desired length. Typically, either a knife or scissors is used for cutting. However, both of these tools can be dangerous to use. Additionally, while trimming or cutting the paper, it is easy for the paper to tilt, resulting in an uneven cutting surface that makes usage inconvenient.

To address these issues, a roll paper cutting device has been designed.

SUMMARY

The technical problem to be solved by the present invention is to overcome the defects of the above-mentioned technology and provide a roll paper cutting device.

To solve the above technical problems, the technical solution provided by the present invention is a roll paper cutting device, comprising a left semi-cylinder, a right semi-cylinder and a cutting mechanism, the lower end of the left semi-cylinder and the lower end of the right semi-cylinder are rotatably connected by a pin, the upper ends of the left semi-cylinder and the right semi-cylinder are both extended with a flat plate, the flat plate located on the right semi-cylinder is provided with a right plug-in slot, the flat plate located on the left semi-cylinder is provided with a left plug-in slot, the left plug-in slot and the right plug-in slot are arranged oppositely, the top of the left plug-in slot is provided with a through-plate and a plug-in slot on the left semi-cylinder, one end of the cutting mechanism is plugged into the left plug-in slot and the upper plug-in slot, the other end of the cutting mechanism cooperates with the right plug-in slot, when the flat plate on the left semi-cylinder and the flat plate on the right semi-cylinder are docked, plugged into the right plug-in slot, and paper is placed between the two flat plates, the left semi-cylinder and the right semi-cylinder can be moved to cut the paper through the cutting mechanism.

Preferably, the cutting mechanism comprises a lower plug-in plate, an upper plug-in plate, an L-shaped connecting plate, and a blade, the upper end of the lower plug-in plate is provided with an upper plug-in plate, the lower plug-in plate and the upper plug-in plate are connected at the side ends thereof and an L-shaped connecting plate is provided, one end of the L-shaped connecting plate cooperates with the right plug-in slot when the flat plate on the left semi-cylinder and the flat plate on the right semi-cylinder are docked, they are plugged into the right plug-in slot, the lower plug-in plate is plugged into the left plug-in slot, the upper plug-in plate is plugged into the upper plug-in slot, a mounting slot is provided in the L-shaped connecting plate, one end of the mounting slot extends into the lower plug-in plate, and the blade is installed in the mounting slot Preferably, the blade and the mounting slot are interference fit.

Preferably, a notch is provided at the bottom of the left plug-in slot. The notch extends downward out of the left plug-in seat, an elastic plate is provided in the middle of the notch, a groove is provided at the upper end of the elastic plate, a protrusion is provided at the bottom of the lower plug-in plate, and when the lower plug-in plate is plugged into the left plug-in slot, the protrusion is placed in the groove.

Preferably, the upper plug-in slot's width is smaller than the left plug-in slot's width.

Preferably, anti-slip patterns are provided on the outer walls of the left semi-cylinder and the right semi-cylinder.

The advantages of the present invention compared with the prior art are:

1. The roll paper cutting device described in this invention features an enhanced opening and closing design. When it's time to cut paper, the left and right half-cylinders can be opened to allow easy access for inserting the roll paper. Once the paper is in place, the half-cylinders can be closed, and the paper can then be cut using a blade. This design not only makes it more convenient to load the roll paper but also simplifies the process of changing and cutting different types of roll paper.

2. Hidden Blade Design: The blade is securely housed in the installation slot of the cutting mechanism, keeping it completely concealed within the device. This hidden blade design prevents any part of the blade from protruding during the cutting process. As a result, users will not come into contact with the blade while in operation, significantly reducing safety risks and protecting against blade-related injuries. Additionally, this design eliminates the issue of inaccurate cutting caused by blade exposure, ensuring that the product maintains consistent cutting accuracy throughout its use.

3. To use the paper roll cutting device, the user simply needs to position the left half-cylinder and the right half-cylinder onto the paper roll. Next, the user should rotate these two half-cylinders to connect them. Then, one end of the paper must be inserted between the two flat plates. After that, the user can push the cutting device along the paper to make the cut. This process is straightforward, convenient, and quick. The design enhances efficiency, allowing users to complete paper cutting in a short amount of time.

4. The roll paper cutting device can be used in various settings such as offices, homes, schools, and more. It is compatible with different types of roll paper, which enhances its versatility and potential applications. This broad range of uses contributes to both the market value and practical value of the device.

5. Enhanced Blade Replacement and Cleaning Method: With the blade being embedded and concealed, users do not need to handle the blade during replacement or cleaning. This not only increases convenience but also minimizes the risk associated with handling the blade.

BRIEF DESCRIPTION OF THE DRAWINGS

As shown in FIG. 1-7:

1. left semi-cylinder,
2. right semi-cylinder,
3. flat plate,
4. bump,
5. anti-skid pattern,
6. left plug-in slot,
7. right plug-in slot,
8. upper plug-in slot,
9. lower plug-in plate,
10. upper plug-in plate,
11. L-shaped connecting plate,
12. blade,
13. mounting slot,
14. notch,
15. elastic plate,
16. groove While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Figure 1:
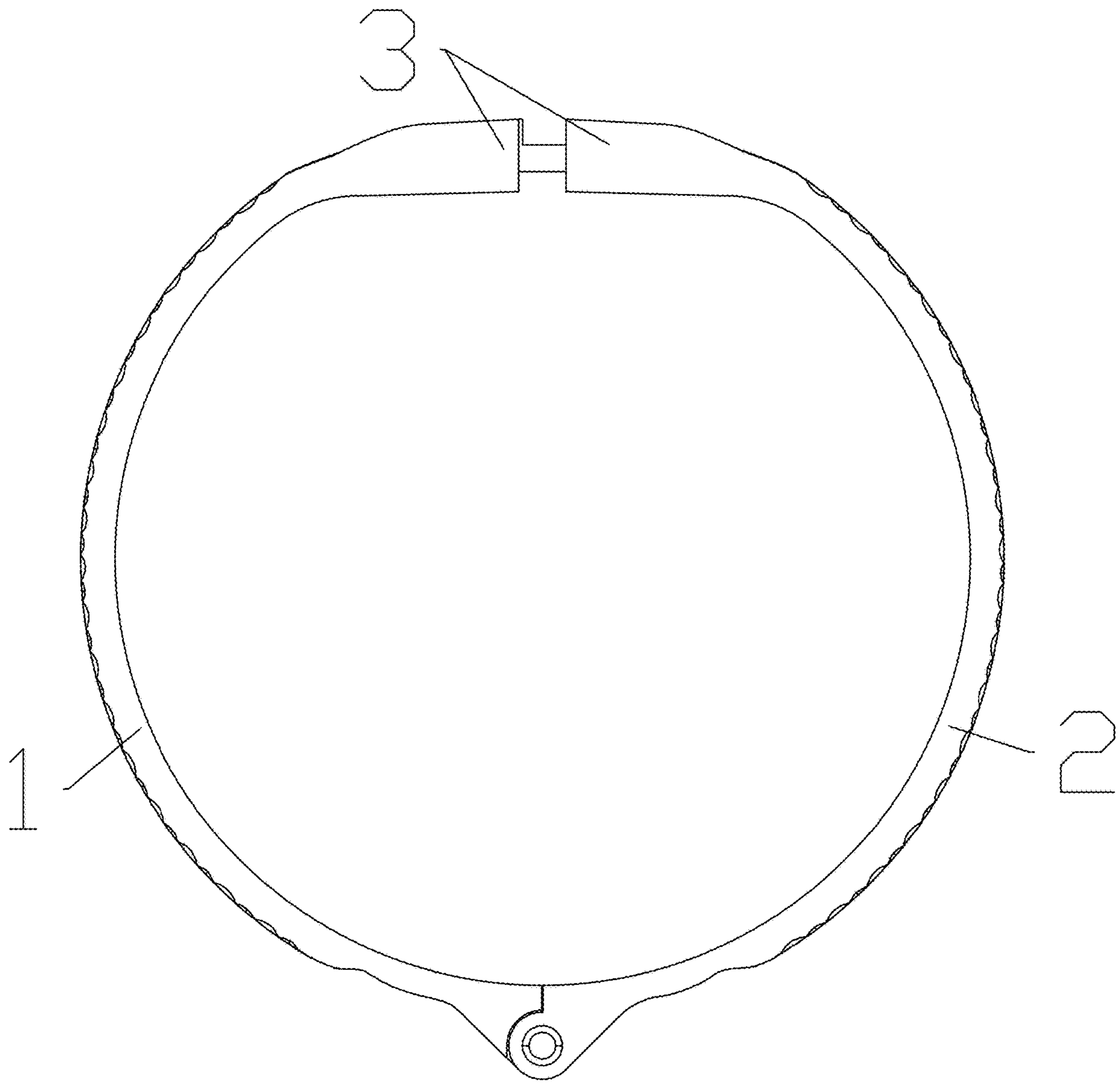
FIG. 1 is a front view of a web paper cutting device of the present invention.
Figure 2:
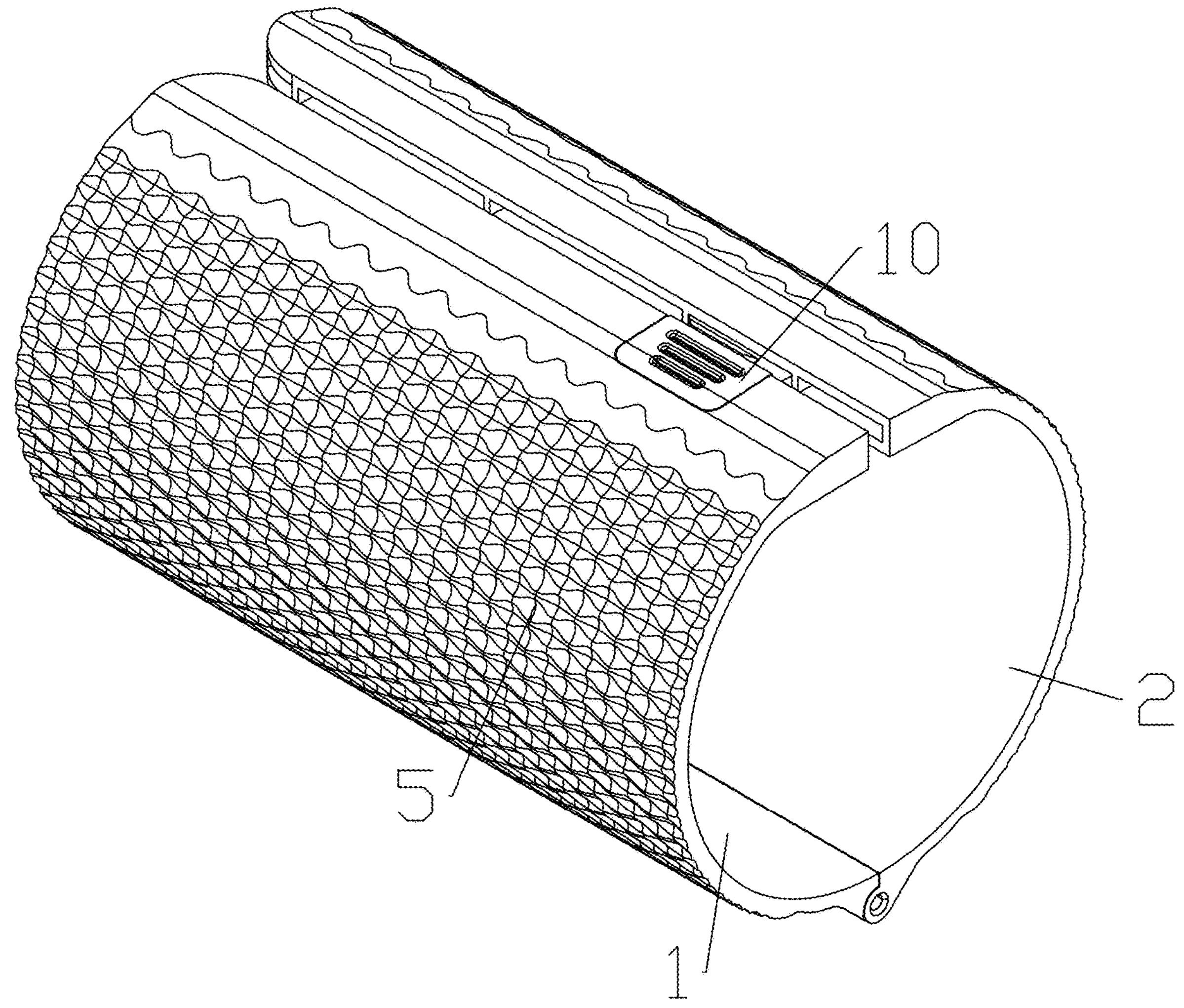
FIG. 2 is a top view of a stereoscopic structure diagram of a web paper cutting device of the present invention.
Figure 3:
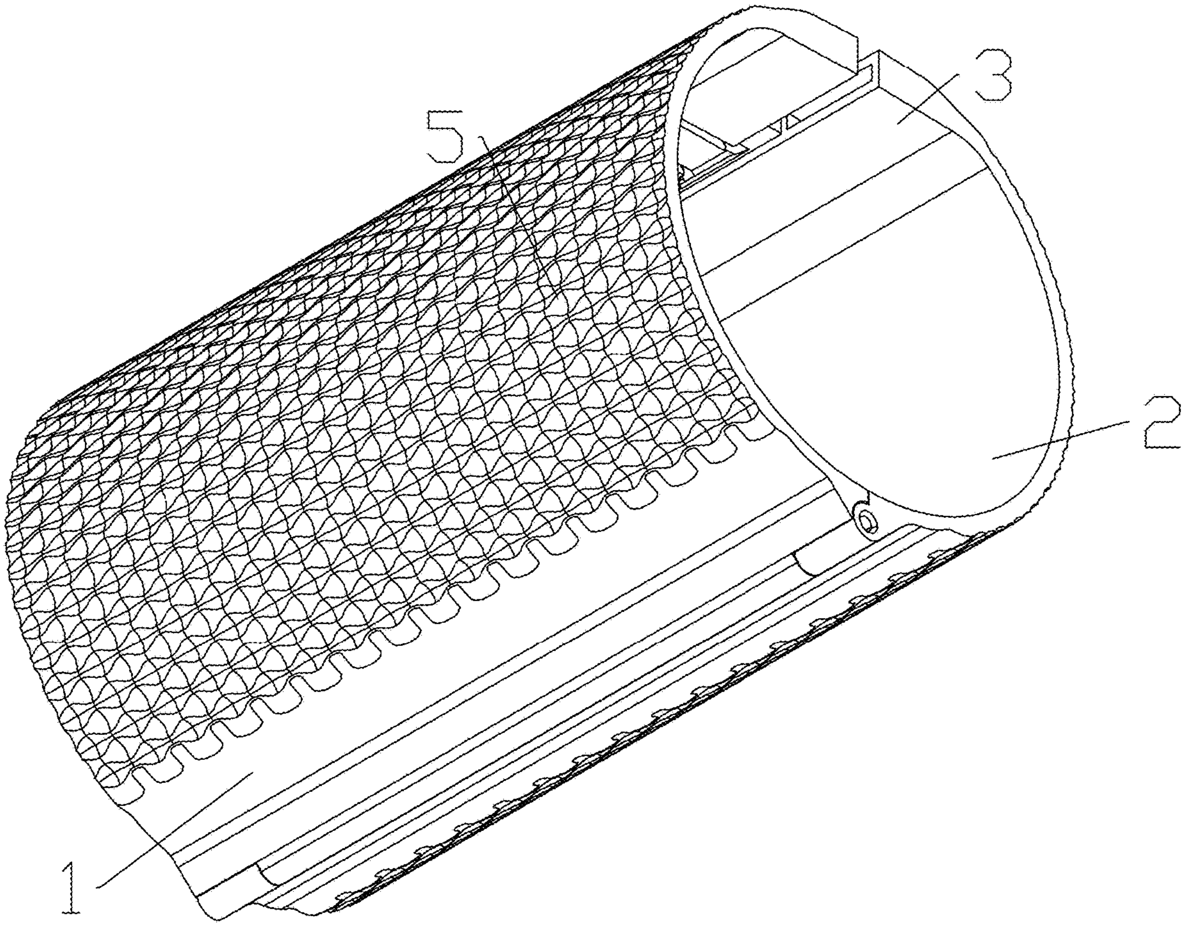
FIG. 3 is a bottom view of a stereoscopic structure diagram of a web paper cutting device of the present invention.
Figure 4:
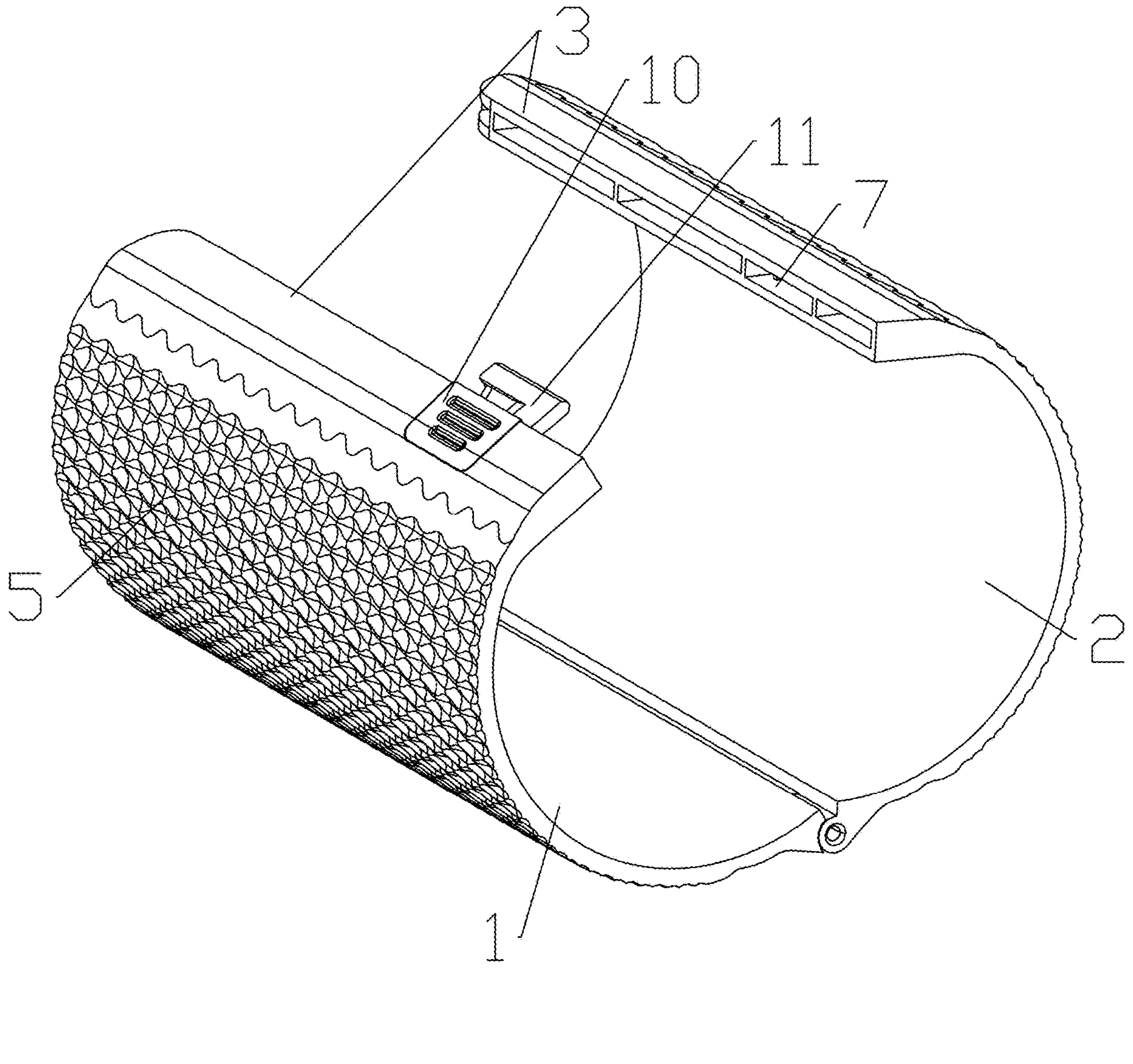
FIG. 4 is a schematic diagram of the structure of the left semi-cylinder of a web paper cutting device of the present invention.
Figure 5:
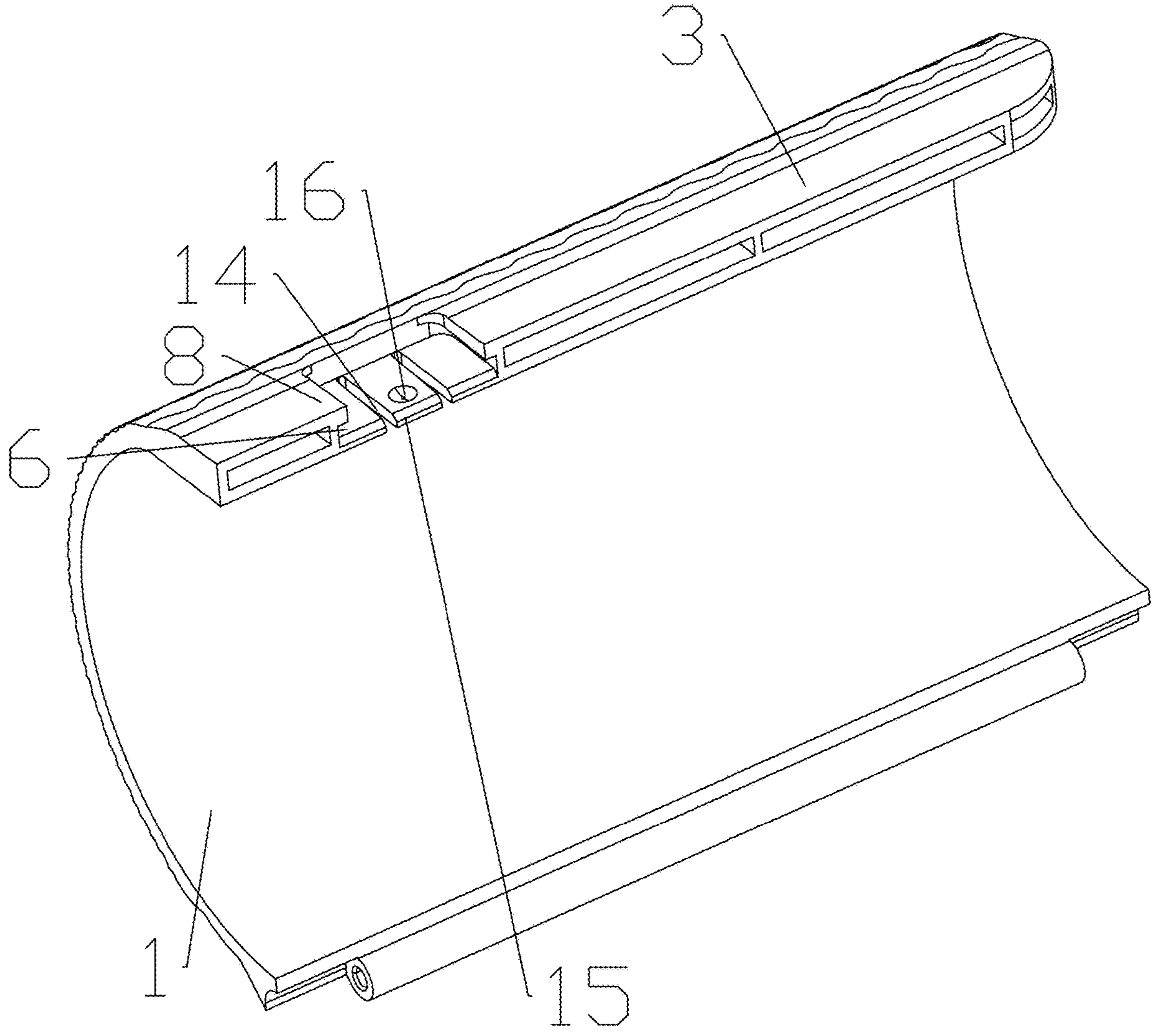
FIG. 5 is a reference diagram of the left and right semi-cylinders of a web paper cutting device of the present invention in an unfolded state.
Figure 6:
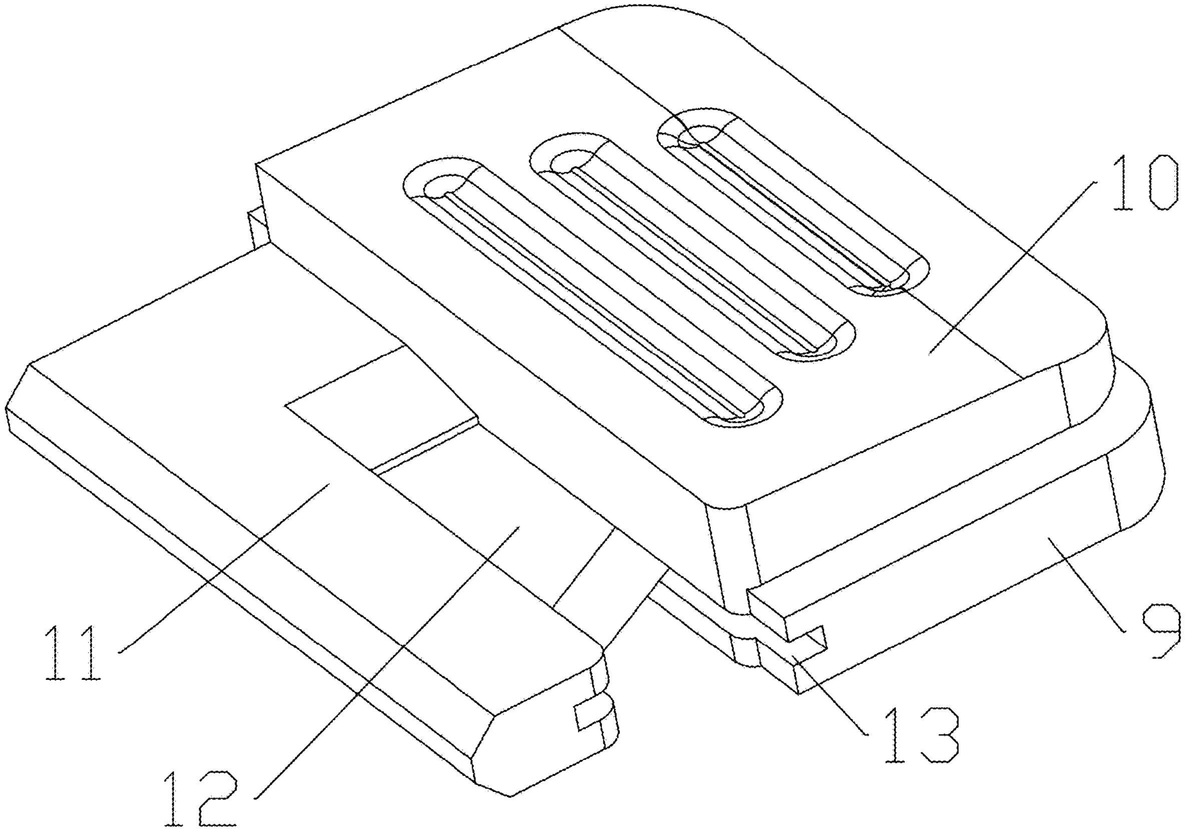
FIG. 6 is a schematic diagram of the structure of a cutting device of a web paper cutting device of the present invention.
Figure 7:
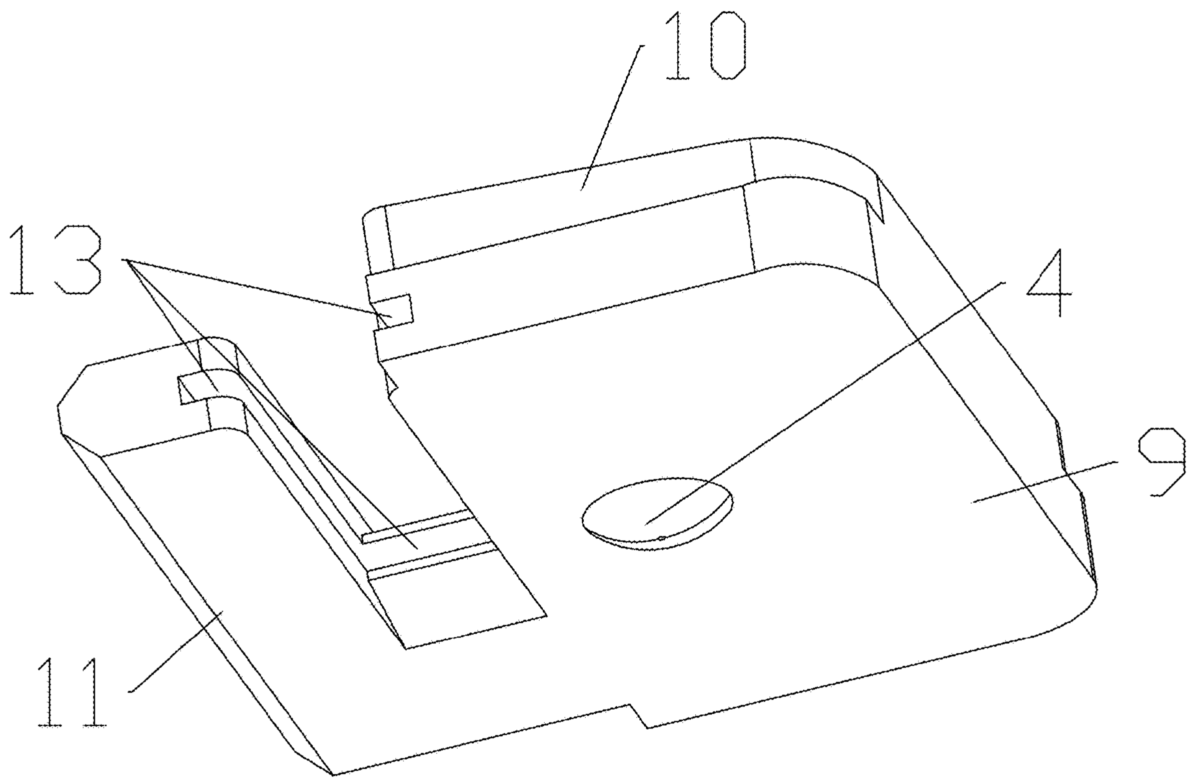
FIG. 7 is a schematic diagram of the structure of a cutting device of a web paper cutting device of the present invention in a disassembled state.

As shown in FIG. 1-7, A roll paper cutting device, comprising a left semi-cylinder 1, a right semi-cylinder 2 and a cutting mechanism, wherein the lower end of the left semi-cylinder 1 and the lower end of the right semi-cylinder 2 are rotatably connected by a pin, so that the two can rotate and open relatively, and the upper ends of the left semi-cylinder 1 and the right semi-cylinder 2 are both extended with a flat plate 3, and the flat plate 3 located on the right semi-cylinder 2 is provided with a right plug-in groove 7, and the flat plate 3 located on the left semi-cylinder 1 is provided with a left plug-in groove 6, and the left plug-in groove 6 and the right plug-in groove 7 are arranged oppositely, and the top of the left plug-in groove 6 is provided with a connecting rod that penetrates the flat plate 3 and the left semi-cylinder 1, one end of the cutting mechanism is inserted into the left plug-in groove 6 and the upper plug-in slot 8, and the other end of the cutting mechanism cooperates with the right plug-in slot 7. When the flat plate 3 on the left semi-cylinder 1 and the flat plate 3 on the right semi-cylinder 2 are docked, they are inserted into the right plug-in slot 7. When the left semi-cylinder 1 and the right semi-cylinder 2 are rotated and docked, paper is placed between the two flat plates 3, and the left semi-cylinder 1 and the right semi-cylinder 2 can be moved to cut the paper through the cutting mechanism. Moreover, since the paper is between the two flat plates 3, the stability and accuracy of the cutting process are ensured.

The cutting mechanism includes a lower plug-in plate 9, an upper plug-in plate 10, an L-shaped connecting plate 11 and a blade 12. The upper end of the lower plug-in plate 9 is provided with an upper plug-in plate 10, and an L-shaped connecting plate 11 is provided at the side connection of the lower plug-in plate 9 and the upper plug-in plate 10. One end of the L-shaped connecting plate 11 cooperates with the right plug-in slot 7. When the flat plate 3 on the left semi-cylinder 1 and the flat plate 3 on the right semi-cylinder 2 are docked, they are plugged into the right plug-in slot 7, the lower plug-in plate 9 is plugged into the left plug-in slot 6, the upper plug-in plate 10 is plugged into the upper plug-in slot 8, and a mounting slot 13 is provided in the L-shaped connecting plate 11. One end of the mounting slot 13 extends into the lower plug-in plate 9, and the blade 12 is installed in the mounting slot 13.

The blade 12 and the mounting slot 13 are interference fit, so that the blade 12 is installed more firmly.

A notch 14 is provided at the bottom of the left plug-in groove 6, and the notch 14 extends downward from the bump 4. An elastic plate 15 is provided in the middle of the notch 14, and a groove 16 is provided at the upper end of the elastic plate 15. A bump 4 is provided at the bottom of the lower plug-in plate 9. When the lower plug-in plate 9 is plugged into the left plug-in groove 6, the bump 4 is placed in the groove 16 to prevent the cutting mechanism from loosening during the cutting process.

The width of the upper plug-in slot 8 is smaller than the width of the left plug-in slot 6.

The outer walls of the left semi-cylinder 1 and the right semi-cylinder 2 are provided with anti-skid patterns 5, so that when the operator holds the left semi-cylinder 1 and the right semi-cylinder 2 for moving cutting, it can play an anti-skid role and can cut paper more accurately.

In Embodiment 1, for the case where the web diameter is less than or equal to the diameter of the left semi-cylinder 1 and the right semi-cylinder 2:

When in use, first put the roll paper on the left semi-cylinder 1 and the right semi-cylinder 2, and make one end of the roll paper located on one side of the cutting mechanism, then rotate the left semi-cylinder 1 and the right semi-cylinder 2 to merge, so that one end of the L-shaped connecting plate 11 is inserted into the right plug-in slot 7, and at the same time adjust the insertion depth so that there is a certain gap between the two flat plates 3, so that the paper of the roll paper is located between the two flat plates 3, and then push the left semi-cylinder 1 and the right semi-cylinder 2 to move along the roll paper, and the blade 12 will cut the paper of the roll paper, and because the left semi-cylinder 1 and the right semi-cylinder 2 are sleeved on the roll paper, this allows the device to move in a straight line, and on the other hand, the paper is located between the two flat plates 3, which also limits the shaking of the paper, so that the cutting device can cut more accurately and ensure stable cutting accuracy.

When the blade 12 needs to be replaced, the blade 12 can be directly removed from the mounting slot 13 with pliers, and then replaced with a new blade 12.

In Embodiment 2, wherein the web diameter is larger than the diameter of the left semi-cylinder 1 and the right semi-cylinder 2:

When in use, first put the roll paper on the left semi-cylinder 1 and the right semi-cylinder 2, and make one end of the roll paper on one side of the cutting mechanism, then rotate the left semi-cylinder 1 and the right semi-cylinder 2 to merge them. Since the diameter of the roll paper is relatively large, one end of the L-shaped connecting plate 11 cannot be plugged into the right plug-in slot 7. Then make the paper of the roll paper stick to the side of the flat plate 3 on the left semi-cylinder 1, and then push the left semi-cylinder 1 and the right semi-cylinder 2 to move along the roll paper, and the blade 12 will cut the paper of the roll paper. Moreover, since the left semi-cylinder 1 and the right semi-cylinder 2 are sleeved on the roll paper, this device can move in a straight line. At the same time, when moving, try to make the paper stick to the side of the flat plate 3, so that the cutting device can cut more accurately and ensure stable cutting accuracy.

When the blade 12 needs to be replaced, the blade 12 can be directly removed from the mounting slot 13 with pliers, and then replaced with a new blade 12.

What is claimed is:

1. A roll paper cutting device, comprising a left semi-cylinder, a right semi-cylinder and a cutting mechanism, wherein a lower end of the left semi-cylinder and a lower end of the right semi-cylinder are rotatably connected by a pin, and each of two flat plates is extended from an upper end of the left semi-cylinder and an upper end of the right semi-cylinder, and a right plugging groove is arranged in the flat plate located on the right semi-cylinder, and a left plugging groove is arranged in the flat plate located on the left semi-cylinder, and the left plugging groove and the right plugging groove are arranged opposite to each other, and a plugging groove penetrating the flat plate located on the left semi-cylinder and an upper plugging groove of the left semi-cylinder is arranged on the top of the left plugging groove, one end of the cutting mechanism is plugged into the left plugging groove and the upper plugging groove, and the other end of the cutting mechanism cooperates with the right plugging groove, and paper is placed between the two flat plates, and the left semi-cylinder and the right semi-cylinder can be moved to cut the paper through the cutting mechanism.

2. The roll paper cutting device of claim 1, wherein the cutting mechanism comprises a lower plug-in plate, an upper plug-in plate, an L-shaped connecting plate and a blade, wherein the upper plug-in plate is provided at an upper end of the lower plug-in plate, the L-shaped connecting plate is provided at a connection between the lower plug-in plate and side ends of the upper plug-in plate, one end of the L-shaped connecting plate cooperates with the right plugging groove, when the flat plate on the left semi-cylinder and the flat plate on the right semi-cylinder are docked, they are plugged into the right plugging groove, the lower plug-in plate is plugged into the left plugging groove, the upper plug-in plate is plugged into the upper plugging groove, a mounting slot is provided in the L-shaped connecting plate, one end of the mounting slot extends into the lower plug-in plate, and the blade is installed in the mounting slot.

3. The roll paper cutting device of claim 2, wherein the blade and the mounting slot are interference fit.

4. The roll paper cutting device of claim 2, wherein a width of upper plugging groove is smaller than a width of the left plugging groove.

5. The roll paper cutting device of claim 1, wherein outer walls of the left and right semi-cylinders are provided with anti-slip patterns.

* * * * *